US012778186B2

(12) United States Patent
Lee et al.

(10) Patent No.: US 12,778,186 B2
(45) Date of Patent: Nov. 3, 2026

(54) METHOD OF COATING TIPPING PAPER FOR SMOKING ARTICLE AND SMOKING ARTICLE MANUFACTURED ACCORDING THERETO

(71) Applicant: KT&G CORPORATION, Daejeon (KR)

(72) Inventors: Seung Hwan Lee, Daejeon (KR); Ho Rim Song, Daejeon (KR); Man Seok Seo, Daejeon (KR); Dong Kyun Ko, Daejeon (KR); Soo Ho Kim, Daejeon (KR); In Beom Song, Daejeon (KR); Ki Jin Ahn, Daejeon (KR); Youn Keun Oh, Daejeon (KR); Hyung Joo Choi, Daejeon (KR)

(73) Assignee: KT&G CORPORATION, Daejeon (KR)

( * ) Notice: Subject to any disclaimer, the term of this patent is extended or adjusted under 35 U.S.C. 154(b) by 381 days.

(21) Appl. No.: 17/918,262

(22) PCT Filed: Nov. 18, 2021

(86) PCT No.: PCT/KR2021/016942
§ 371 (c)(1),
(2) Date: Oct. 11, 2022

(87) PCT Pub. No.: WO2022/154237
PCT Pub. Date: Jul. 21, 2022

(65) Prior Publication Data

US 2023/0157352 A1 May 25, 2023

(30) Foreign Application Priority Data

Jan. 12, 2021 (KR) ........................ 10-2021-0003881

(51) Int. Cl.
*A24D 1/02* (2006.01)
*A24B 15/28* (2006.01)
(Continued)

(52) U.S. Cl.
CPC .............. *A24D 1/02* (2013.01); *A24B 15/282* (2013.01); *A24B 15/301* (2013.01); *A24B 15/32* (2013.01);
(Continued)

(58) Field of Classification Search
None
See application file for complete search history.

(56) References Cited

U.S. PATENT DOCUMENTS

2005/0016556 A1 * 1/2005 Ashcraft ................ A24D 1/025 131/365
2007/0000505 A1 1/2007 Zhuang et al.
(Continued)

FOREIGN PATENT DOCUMENTS

CN 102952637 A 3/2013
CN 109770416 A 5/2019
(Continued)

OTHER PUBLICATIONS

Office Action dated Jan. 20, 2023 from the Russian Patent Office in Application No. 2022123060/03(049403).
(Continued)

*Primary Examiner* — Philip Y Louie
*Assistant Examiner* — Jeffrey A. Buckman
(74) *Attorney, Agent, or Firm* — Sughrue Mion, PLLC

(57) ABSTRACT

An embodiment of the present disclosure provides a smoking article including a smoking material portion which is wrapped with a smoking material wrapper, a filter portion which has an upstream end combined with the smoking material portion and is wrapped with a filter wrapper, and a
(Continued)

tipping paper which wraps around the filter portion and at least a portion of the smoking material portion so that the smoking material portion and the filter portion are combined, wherein a design printing layer, an overprint (OP) coating layer, and a sweetener coating layer are disposed on a surface of the tipping paper.

12 Claims, 2 Drawing Sheets

(51) Int. Cl.

| | |
|---|---|
| ***A24B 15/30*** | (2006.01) |
| ***A24B 15/32*** | (2006.01) |
| ***A24B 15/36*** | (2006.01) |
| ***A24B 15/40*** | (2006.01) |
| ***A24C 5/56*** | (2006.01) |
| ***A24C 5/60*** | (2006.01) |
| ***A24D 1/00*** | (2020.01) |
| ***A24D 1/04*** | (2006.01) |
| ***B41M 3/00*** | (2006.01) |
| ***D21H 19/12*** | (2006.01) |
| ***D21H 19/82*** | (2006.01) |

(52) U.S. Cl.

CPC .......... *A24B 15/365* (2013.01); *A24B 15/406* (2013.01); *A24C 5/565* (2013.01); *A24C 5/601* (2013.01); *A24C 5/608* (2013.01); *A24D 1/002* (2013.01); *A24D 1/045* (2013.01); *B41M 3/006* (2013.01); *D21H 19/12* (2013.01); *D21H 19/82* (2013.01)

(56) References Cited

U.S. PATENT DOCUMENTS

| | | | | |
|---|---|---|---|---|
| 2008/0047571 | A1 | 2/2008 | Braunshteyn et al. | |
| 2010/0108081 | A1* | 5/2010 | Blevins Joyce ....... | A24D 1/025 131/274 |
| 2016/0302474 | A1 | 10/2016 | Chen et al. | |
| 2017/0064995 | A1* | 3/2017 | Beeson .................. | A24D 1/002 |
| 2020/0323258 | A1* | 10/2020 | Sakurai .................. | D21H 27/08 |
| 2022/0007708 | A1* | 1/2022 | Fuhrmann ............. | A24D 1/002 |

FOREIGN PATENT DOCUMENTS

| | | | |
|---|---|---|---|
| CN | 110652030 | A | 1/2020 |
| CN | 110714367 | A | 1/2020 |
| CN | 111576092 | A | 8/2020 |
| JP | 2009-5675 | A | 1/2009 |
| KR | 10-2013-0112431 | A | 10/2013 |
| KR | 10-2016-0094932 | A | 8/2016 |
| KR | 10-2017-0000173 | A | 1/2017 |
| KR | 10-2019-0134471 | A | 12/2019 |
| RU | 2 410 993 | C2 | 2/2011 |
| RU | 2 426 680 | C2 | 8/2011 |
| RU | 2 514 407 | C2 | 4/2014 |
| RU | 2 642 398 | C2 | 1/2018 |
| WO | 2020/089055 | A1 | 5/2020 |

OTHER PUBLICATIONS

Office Action dated Feb. 17, 2023 from the Korean Patent Office in Application No. 10-2021-0003881.

International Search Report for PCT/KR2021/016942, dated Mar. 2, 2022.

Communication dated Jan. 26, 2025, issued in Chinese Application No. 202180022753.0.

* cited by examiner

COMPARATIVE EXAMPLE 1 (ETHANOL-BASED)

COMPARATIVE EXAMPLE 2 (WATER-BASED)

EXAMPLE 1 (WATER AND ETHANOL BASED)

METHOD OF COATING TIPPING PAPER FOR SMOKING ARTICLE AND SMOKING ARTICLE MANUFACTURED ACCORDING THERETO

CROSS REFERENCE TO RELATED APPLICATIONS

This application is a National Stage of International Application No. PCT/KR2021/016942 filed Nov. 18, 2021, claiming priority based on Korean Patent Application No. 10-2021-0003881 filed Jan. 12, 2021.

TECHNICAL FIELD

The present disclosure relates to a method of coating tipping paper for a smoking article and a smoking article manufactured according thereto, and more particularly, to a method of coating tipping paper for a smoking article that includes a sweetener coating process in addition to design printing and overprint (OP) coating processes, thus addressing various limitations in conventional sweetener application, and a smoking article manufactured according to the method.

BACKGROUND ART

Generally, in order to manufacture a cigarette, first, various types of tobacco materials such as tobacco leaves and reconstituted tobacco leaves are mixed and processed and then wrapped with cigarette paper, and then a filter is attached thereto. The filter is connected to a smoking material portion, which is filled with the tobacco materials, by tipping paper. In general, a printing process is performed on a surface of the tipping paper. In addition, in order to improve print stability, such as prevention of the removal of ink printed by the printing process, and reduce adhesion between the lips and the paper (lip-release), an overprint (OP) coating or overprint varnish (OPV) process may be performed on a surface of the tipping paper.

Meanwhile, in a conventional process of coating tipping paper with a sweetener, in general, water-based materials such as sucralose and a ginseng concentrate are distributed in small amounts in isopropyl alcohol (WA) and ethyl acetate (EA), which are oil-based solvents of an OP coating solution. However, since the use of the oil-based solvents cause limitations in the applicable materials, applied content, and uniform application, it is not possible to realize various flavors and a flavor intensity cannot be increased over a certain level.

DISCLOSURE

Technical Problem

The present disclosure is directed to providing a method of coating tipping paper for a smoking article and a smoking article manufactured according thereto capable of addressing the above-mentioned problems in sweetener application and addressing various limitations.

Objectives of the present disclosure are not limited to the above-mentioned objective, and other unmentioned objectives should be clearly understood by those of ordinary skill in the art to which the present disclosure pertains from the description below.

Technical Solution

Some embodiments of the present disclosure provide a smoking article including a smoking material portion which is wrapped with a smoking material wrapper, a filter portion which is wrapped with a filter wrapper and has an upstream end combined with the smoking material portion, and a tipping paper which wraps around the filter portion and at least a portion of the smoking material portion so that the smoking material portion and the filter portion are combined, wherein a design printing layer, an overprint (OP) coating layer, and a sweetener coating layer are disposed on a surface of the tipping paper.

In some embodiments, the sweetener coating layer may be formed on the OP coating layer.

Also, some embodiments of the present disclosure provide a method of coating a tipping paper for a smoking article, the method including a design printing step of printing design on at least a portion of the tipping paper, an overprint (OP) coating step of coating a surface of the tipping paper with an OP coating solution, and a sweetener coating step of coating the surface of the tipping paper with a sweetener coating solution, wherein the sweetener coating step is performed as a separate process from the design printing step and the OP coating step.

Here, the sweetener coating step may be performed after the design printing step and the OP coating step. Further, the sweetener coating solution may consist of a sweetener composition and a mixed solvent of water and ethanol.

In some embodiments, a weight of the sweetener composition included in the sweetener coating solution may be in a range of 3% to 40% of the total weight of the sweetener coating solution.

The sweetener composition may include one or more water-soluble sweetener materials and one or more fat-soluble sweetener materials.

The sweetener composition may include a first sweetener material which consists of one or more of sodium glutamate, salt, sodium saccharin, xylitol, sucralose, tomatine, stevia, erythritol, and psicose and a second sweetener material which consists of one or more of citric acid, malic acid, lactic acid, and catechin. The sweetener composition may further include a third sweetener material which consists of one or more of saccharin, menthol, eucalyptol, phenylacetic acid, and cinnamon oil.

In some embodiments, a sum of weights of the first sweetener material and the third sweetener material included in the sweetener composition may be in a range of 70% to 99% of the total weight of the sweetener composition, and a weight of the second sweetener material may be in a range of 1% to 30% of the total weight of the sweetener composition.

Preferably, the first sweetener material may include a 1-1 sweetener material which is one or more selected from sodium glutamate and salt and a 1-2 sweetener material which is one or more selected from sodium saccharin, xylitol, sucralose, tomatine, stevia, erythritol, and psicose. Here, a weight of the 1-1 sweetener material included in the sweetener composition may be in a range of 1% to 30% of the total weight of the first sweetener material, and a weight of the 1-2 sweetener material may be in a range of 70% to 99% of the total weight of the first sweetener material.

In some embodiments, a mixing ratio of the water to the ethanol included in the mixed solvent may be in a range of 1:0.8 to 1:5.0, and preferably, the mixing ratio of the water to the ethanol may be dependent on the composition of the sweetener composition. Specifically, a weight ratio of the water with respect to the total weight of the mixed solvent may be defined by Equation 1 below.

$$R_W = \frac{PW_1 + 0.85 \times PW_3}{PW_1 + 1.1 \times PW_2 + PW_3} \quad \text{[Equation 1]}$$

Here, $R_W$ may represent the weight ratio of the water with respect to the total weight of the mixed solvent, $PW_1$ may represent parts by weight of the first sweetener material with respect to 1 part by weight of the sweetener composition, $PW_2$ may represent parts by weight of the second sweetener material with respect to 1 part by weight of the sweetener composition, and $PW_3$ may represent parts by weight of the third sweetener material with respect to 1 part by weight of the sweetener composition.

Advantageous Effects

According to a method of coating tipping paper according to embodiments of the present disclosure, a sweetener coating layer containing a sufficient amount of sweetener material can be evenly applied throughout the tipping paper without problems such as precipitation of a sweetener composition, an occurrence of curling of the tipping paper, and ink spreading or ink removal from printed design.

Further, sweetener materials capable of providing diverse and differentiated tobacco smoke tastes to a user can be utilized in various ways, and accordingly, it is possible to provide smoking articles in which tipping paper is coated with sweeteners providing various taste characteristics.

MODES OF THE INVENTION

Figure 1:
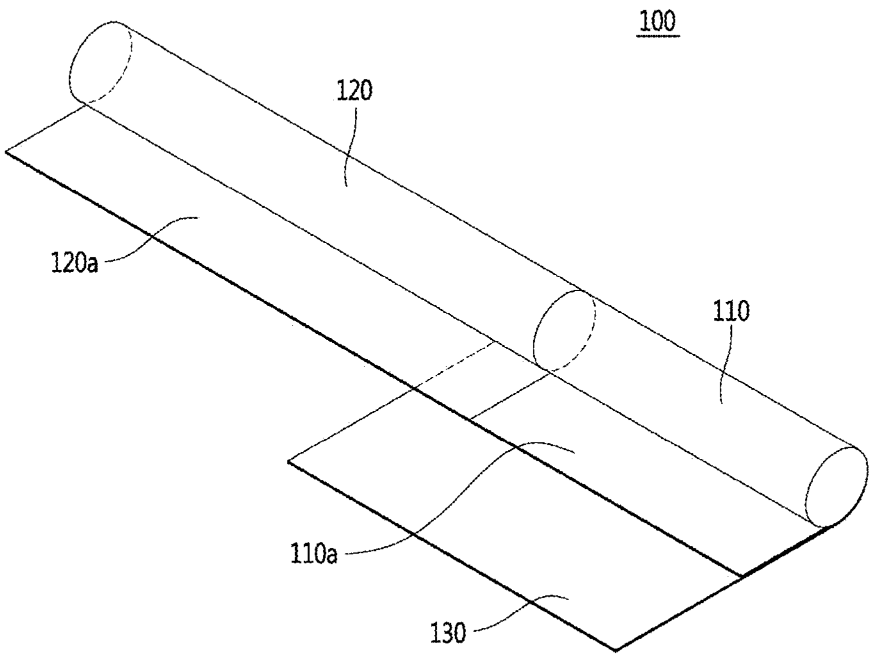
FIG. 1 is a view illustrating a schematic configuration of a smoking article including tipping paper coated with a functional material according to some embodiments of the present disclosure.

Hereinafter, exemplary embodiments of the present disclosure will be described in detail with reference to the accompanying drawings. Advantages and features of the present disclosure and methods of achieving the same should become clear with embodiments described in detail below with reference to the accompanying drawings. However, the present disclosure is not limited to the embodiments disclosed below and may be implemented in various other forms. The embodiments make the disclosure of the present disclosure complete and are provided to completely inform those of ordinary skill in the art to which the present disclosure pertains of the scope of the disclosure. The present disclosure is defined only by the scope of the claims. Like reference numerals refer to like elements throughout.

Unless otherwise defined, all terms including technical or scientific terms used herein have the same meaning as commonly understood by those of ordinary skill in the art to which the present disclosure pertains. Terms defined in commonly used dictionaries should not be construed in an idealized or overly formal sense unless expressly so defined herein.

Also, in the specification, a singular expression includes a plural expression unless the context clearly indicates otherwise. The terms “comprises” and/or “comprising” used herein do not preclude the possibility of the presence or addition of one or more elements, steps, operations, and/or devices other than those mentioned.

Terms including ordinals such as “first” or “second” used herein may be used to describe various elements, but the elements are not limited by the terms. The terms are only used for the purpose of distinguishing one element from another element.

Throughout the specification, “smoking article” may refer to anything capable of generating an aerosol, such as tobacco (cigarette) and cigars. The smoking article may include an aerosol-generating material or an aerosol-forming substrate. Also, the smoking article may include a solid material based on tobacco raw materials, such as reconstituted tobacco leaves, shredded tobacco, and reconstituted tobacco. A smoking material may include a volatile compound.

FIG. 1 is a view illustrating a schematic configuration of a smoking article including tipping paper coated with a functional material according to some embodiments of the present disclosure.

In the specification, a case in which a smoking article 100 is a combustion-type cigarette is described as an example. However, according to embodiments, the smoking article 100 may be a heating-type cigarette or the like that is used together with an aerosol generation device (not illustrated) such as an electronic cigarette device.

Referring to FIG. 1, the smoking article 100 may include a filter portion 110 wrapped with a filter wrapper 110*a*, a smoking material portion 120 wrapped with a smoking material wrapper 120*a*, and a tipping paper 130 configured to combine the filter portion 110 and the smoking material portion 120.

The filter portion 110 may be disposed downstream of the smoking material portion 120 and may be a region through which an aerosol material generated in the smoking material portion 120 passes right before being inhaled by the user.

The filter portion 110 may be made of various materials. For example, the filter portion 110 may be a cellulose acetate filter. The filter portion 110 may be a cellulose acetate filter not flavored with a flavoring material or a transfer jet nozzle system (TJNS) filter flavored with a flavoring material.

In some embodiments, the filter portion 110 may be a tubular structure including a hollow formed therein. The filter portion 110 may also be manufactured by inserting structures such as films or tubes made of the same or different materials thereinto (for example, into the hollow).

The filter portion 110 of the present embodiment is illustrated as a mono filter formed of a single filter, but the present disclosure is not limited thereto. For example, the filter portion 110 may, of course, be provided as a dual filter which includes two acetate filters, a triple filter, or the like in order to increase filter efficiency.

Further, although not illustrated, a crushable capsule (not illustrated), which has a structure in which a liquid filled therein including a flavoring is wrapped by a film, may be included inside the filter portion 110.

The filter portion 110 is disposed downstream of the smoking material portion 120 to serve as a filter through which an aerosol material generated in the smoking material portion 120 passes right before being inhaled by the user.

The filter portion 110 may be wrapped with the filter wrapper 110*a*. The filter wrapper 110*a* may be manufactured using grease-resistant wrapping paper, and an aluminum foil may be further included at an inner surface of the filter wrapper 110*a*.

The smoking material portion 120 may be filled with raw tobacco leaves, reconstituted tobacco leaves, or a mixture of tobacco leaves and reconstituted tobacco leaves. The mixture may be filled in the form of a sheet or shredded tobacco in the smoking material portion 120. The smoking material portion 120 may have the form of a longitudinally extending rod which may have various lengths, circumferences, and diameters. Also, the smoking material portion 120 may include at least one aerosol-generating material among glycerin, propylene glycol, ethylene glycol, dipropylene glycol, diethylene glycol, triethylene glycol, tetraethylene glycol, and oleyl alcohol. Also, the smoking material portion 120 may contain other additives such as a flavoring agent, a wetting agent, and/or an acetate compound.

The smoking material portion 120 may be wrapped with the smoking material wrapper 120*a*. The smoking material wrapper 120*a* may have a double wrapping paper structure or, further, may be low ignition propensity (LIP) cigarette paper having one or more LIP bands (not illustrated) formed therein.

The filter portion 110 wrapped with the filter wrapper 110*a* and the smoking material portion 120 wrapped with the smoking material wrapper 120*a* may be wrapped together by the tipping paper 130. That is, the tipping paper 130 may wrap around at least a portion (for example, a partial downstream area) of the smoking material wrapper 120*a* and an outer surface of the filter wrapper 110*a*. In other words, the filter portion 110 and at least a portion of the smoking material portion 120 may be further wrapped with the tipping paper 130 and physically combined with each other.

The tipping paper 130 may also include an incombustible material and thus prevent combustion of the filter portion 110.

In some embodiments, the tipping paper 130 may be made of nonporous wrapping paper not treated to be grease-resistant, but is not limited thereto.

Meanwhile, an overprint (OP) coating layer for lip-release and prevention of the removal of ink printed in a design printing process may be disposed on a surface of the tipping paper 130. In this case, there is a possibility that an off-taste may occur during smoking due to the printed ink or a specific component in the OP coating layer.

Thus, in order to maximize a sweetener coating effect to stably provide various tastes and functions to a user while minimizing the off-taste occurrence problem, a design printing layer, the OP coating layer, and a sweetener coating layer (not illustrated) may be disposed on the surface of the tipping paper 130 according to embodiments of the present disclosure.

Specifically, a design printing layer, an OP coating layer, and a sweetener coating layer may be formed on the surface of the tipping paper 130 (that is, an outer side surface coming into contact with the oral region of the user). On the design printing layer, various designs for different manufacturers and product lineups may be printed. The OP coating layer may be coated with an OP coating solution including oil-based OP ink such as nitrocellulose, polyamide, isopropyl alcohol (WA), and ethyl acetate in order to prevent the removal of ink from the design printing layer. The sweetener coating layer may include sweetener materials that serve to provide various tastes, such as a sweet taste, a bitter taste, a salty taste, and a sour taste, to the user when the tipping paper 130 comes into contact with the oral region of the user.

Meanwhile, in some cases, the OP coating solution may include an OP auxiliary agent that consists of a combination of IPA, ethyl acetate, propyl acetate, and the like, but of course, the present disclosure is not limited thereto.

The sweetener coating layer which is formed on the OP coating layer may be formed using a sweetener coating solution which includes a sweetener composition dissolved in a solvent. A method of forming the sweetener coating layer will be described in detail below with reference to FIGS. 2 and 3.

Figure 2:
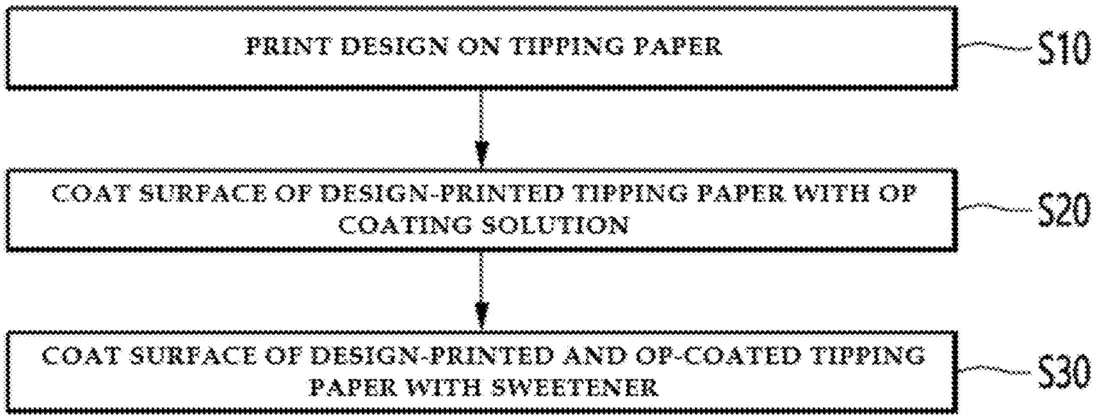
FIGS. 2 and 3 are flowcharts schematically illustrating a method of coating tipping paper according to some embodiments of the present disclosure.
Figure 3:
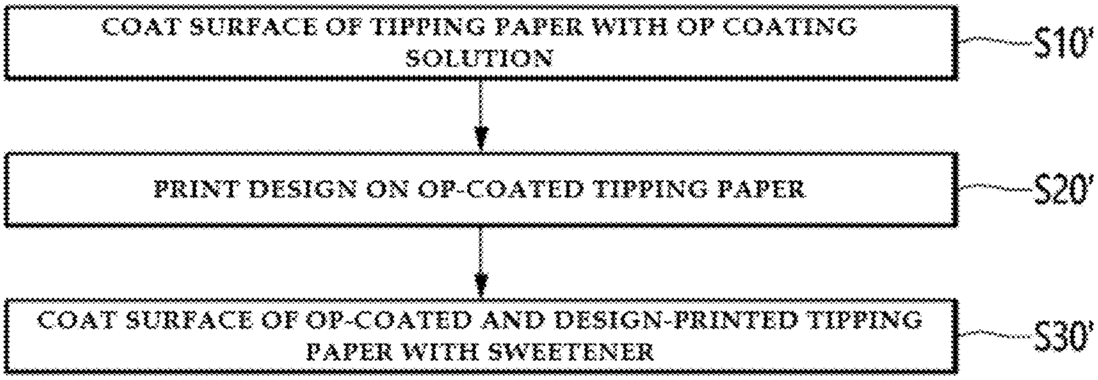

FIGS. 2 and 3 are flowcharts schematically illustrating a method of coating tipping paper according to some embodiments of the present disclosure.

Referring to FIG. 2, the method of coating the tipping paper may include printing a design on the tipping paper (S10), coating a surface of the design-printed tipping paper with the OP coating solution (S20), and coating the surface of the design-printed and OP-coated tipping paper with a sweetener (S30).

The order of performing the design printing step (S10) and the OP coating step (S20), which are performed prior to the sweetener coating step (S30), may be reversed according to characteristics of the tipping paper, printing conditions, and the like. That is, as illustrated in FIG. 3, in the method of coating the tipping paper, coating a surface of the tipping paper with the OP coating solution (S10') may be performed prior to printing a design on the OP-coated tipping paper (S20').

Meanwhile, the sweetener coating step (S30) may be performed as a separate process from the design printing and OP coating processes, regardless of the order of performing the design printing and OP coating processes. Preferably, the sweetener coating step (S30) may be performed after the design printing and OP coating processes are completed, and more preferably, the sweetener coating step (S30) may be performed as the final process in the tipping paper coating process. Accordingly, when the oral region of the user comes into contact with the tipping paper, the sweetener composition in the sweetener coating layer may be more easily provided to the user.

In some embodiments, the sweetener coating solution used in the sweetener coating step (S30) may be a solution in a state in which the sweetener composition is dissolved in a solvent, and preferably, the solvent used in the sweetener coating solution may be a mixed solvent of water and ethanol. That is, in the present disclosure, by using the mixed solvent of water and ethanol in the sweetener coating process unlike in the OP coating process, both a water-soluble sweetener material and a fat-soluble sweetener material may be easily dissolved, and accordingly, it is possible to utilize a wide variety of sweetener materials to provide diverse and differentiated tobacco smoke tastes to the user.

That is, the sweetener composition used in the sweetener coating solution may include one or more water-soluble sweetener materials and one or more fat-soluble sweetener materials, and more preferably, the sweetener composition may include a first sweetener material which consists of one or more of sodium glutamate, salt, sodium saccharin, xylitol, sucralose, tomatine, stevia, erythritol, and psicose, a second sweetener material which consists of one or more of citric acid, malic acid, lactic acid, and catechin, and a third sweetener material which consists of one or more of saccharin, menthol, eucalyptol, phenylacetic acid, and cinnamon oil.

Meanwhile, in order to improve the taste felt by the user when the oral region of the user comes into contact with the tipping paper, preferably, a sum of weights of the first sweetener material and the third sweetener material included in the sweetener composition may be in a range of 70% to 99% of the total weight of the sweetener composition, and a weight of the second sweetener material may be in a range of 1% to 30% of the total weight of the sweetener composition.

Further, the first sweetener material may simultaneously include a 1-1 sweetener material which is one or more selected from sodium glutamate and salt and a 1-2 sweetener material which is one or more selected from sodium saccharin, xylitol, sucralose, tomatine, stevia, erythritol, and psicose. This is advantageous for realizing more balanced taste characteristics. More specifically, a weight of the 1-1 sweetener material included in the sweetener composition may be in a range of 1% to 30% of the total weight of the first sweetener material, and a weight of the 1-2 sweetener material may be in a range of 70% to 99% of the total weight of the first sweetener material.

Meanwhile, in order to perform coating with the sweetener composition, in which various sweetener materials are mixed as described above, with a high concentration without various problems such as precipitation of the composition, an occurrence of curling of the tipping paper, ink spreading or ink removal from printed design, and non-uniform coating, preferably, the solvent of the sweetener composition may be the mixed solvent of water and ethanol. Here, more preferably, a mixing ratio of the water to the ethanol included in the mixed solvent may be in a range of about 1:0.8 to 1:5.0.

Further, the mixing ratio of the water to the ethanol included in the mixed solvent is a very sensitive matter with respect to a sweetener deposition problem or the like, according to the types and composition ratios of the sweetener materials constituting the sweetener composition. That is, preferably, the mixing ratio of the water to the ethanol may be dependent on the composition of the sweetener composition, and more specifically, a weight ratio of the water with respect to the total weight of the mixed solvent may be defined by Equation 1 below. In Equation 1 below, $R_W$ represents the weight ratio of the water with respect to the total weight of the mixed solvent, $PW_1$ represents parts by weight of the first sweetener material with respect to 1 part by weight of the sweetener composition, $PW_2$ represents parts by weight of the second sweetener material with respect to 1 part by weight of the sweetener composition, and $PW_3$ represents parts by weight of the third sweetener material with respect to 1 part by weight of the sweetener composition.

$$R_W = \frac{PW_1 + 0.85 \times PW_3}{PW_1 + 1.1 \times PW_2 + PW_3} \qquad \text{[Equation 1]}$$

Although not illustrated, the above-described method of coating the tipping paper may further include, after the sweetener coating step (S30), a drying step of removing the moisture inside the solvent. Here, when the above-mentioned sweetener materials are coated using the mixed solvent of water and ethanol, preferably, a drying temperature in the drying step may be in a range of about 70° C. to 110° C.

When the sweetener coating solution is formed as described above, even when the weight of the sweetener composition included in the sweetener coating solution exceeds 3% (specifically, is in a range of about 3% to 40%, or more specifically, in a range of about 5% to 30%) with respect to the total weight of the sweetener coating solution, a sweetener coating layer containing a sufficient amount of sweetener material may be evenly applied throughout the tipping paper, without problems such as precipitation of the sweetener composition, an occurrence of curling of the tipping paper, and ink spreading or ink removal from the printed design.

Hereinafter, the configurations of the present disclosure and the advantageous effects according thereto will be described in more detail using embodiments and comparative examples. However, the embodiments are merely for describing the present disclosure in more detail, and the scope of the present disclosure is not limited by the embodiments.

Comparative Example 1

A sweetener coating solution for coating tipping paper was prepared by mixing and dissolving salt, sodium saccharin, tomatine, and citric acid. An ethanol-based solvent was used for dissolving the sweetener composition, and about 20% sweetener composition and about 80% solvent were used.

Comparative Example 2

Except for using a water-based solvent for dissolving the sweetener composition, a sweetener coating solution was prepared in the same manner as in Comparative Example 1.

Embodiment 1

Except for using a mixed solvent of water and ethanol for dissolving the sweetener composition, a sweetener coating solution was prepared in the same manner as in Comparative Example 1.

Experimental Example 1: Evaluation of Solubility in Sweetener Coating Solution In order to check the solubility of a sweetener composition according to a solvent, the sweetener coating solutions according to Comparative Examples 1 and 2 and Embodiment 1 were observed by visual inspection.

Figure 4:
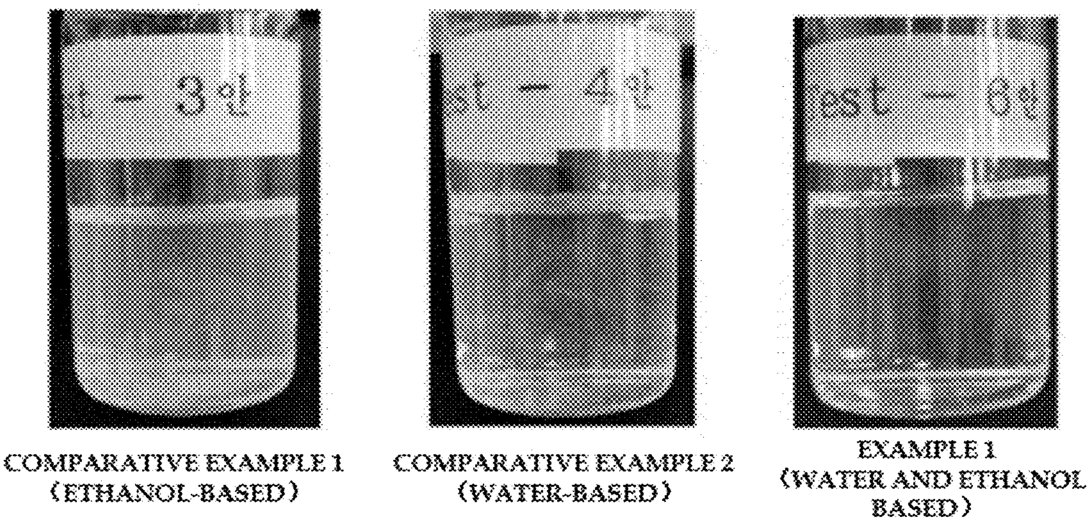
FIG. 4 shows pictures from which an occurrence of precipitation due to incomplete dissolution of a sweetener material can be checked by visual inspection.

FIG. 4 shows pictures from which an occurrence of precipitation due to incomplete dissolution of a sweetener material can be checked by visual inspection, and FIG. 4 shows states of the sweetener coating solutions five minutes after preparation.

Referring to FIG. 4, in the sweetener coating solution according to Embodiment 1 in which the mixed solvent of water and ethanol was used, precipitates and incompletely-dissolved materials were not observed even about five minutes after preparation, and accordingly, it was predicted that the sweetener composition would be sufficiently dissolved in the mixed solvent and thus problems such as non-uniform coating on the tipping paper and deposition of the sweetener material would not occur.

Conversely, in the sweetener coating solution according to Comparative Example 1 in which the ethanol-based solvent was used, cloudy incompletely-dissolved materials due to insufficient solubility were observed, and although not clearly shown in the picture, it can be seen that a precipitate layer formed by precipitates was also present in a lower layer of the solution. In the sweetener coating solution according to Comparative Example 2 in which the water-based solvent was used, solubility was higher as compared to the solution of Comparative Example 1 and precipitates were also not observed by visual inspection, but it can be seen that, due to slightly insufficient solubility, transparency of the solution was slightly degraded.

Comparative Example 3

A sweetener composition formed of sucralose and citric acid was mixed with an OP coating solution to perform OP coating on tipping paper of a smoking article on which design printing had been completed.

Embodiment 2

A sweetener coating solution for coating tipping paper was prepared using about 20% of the sweetener composition formed of sucralose and citric acid and about 80% of the mixed solvent of water and ethanol, and tipping paper of a smoking article on which design printing and OP coating had been completed was coated with a sweetener. The amount of sweetener composition used was the same as in Comparative Example 3, and the sweetener coating solution used was identical to that in Embodiment 1 except for differences in the composition of the sweetener composition.

Embodiment 3

Tipping paper of a smoking article was coated with a sweetener in the same manner as in Embodiment 2 using the sweetener coating solution of Embodiment 1.

Embodiment 4

Except for using a sweetener composition formed of sucralose and phenylacetic acid, tipping paper of a smoking article was coated with a sweetener in the same manner as in Embodiment 3.

Embodiment 5

Except for using a sweetener composition formed of citric acid and salt, tipping paper of a smoking article was coated with a sweetener in the same manner as in Embodiment 3.

Experimental Example 2: Smoking Sensory Evaluation According to Coating with Sweetener Material In order to check the effectiveness in improving sensory characteristics according to sweetener coating methods and sweetener material compositions, sensory evaluation was performed on satisfaction with taste other than tobacco taste, satisfaction with touch on lips, and off-taste for each of the embodiments and comparative example. The sensory evaluation was randomly carried out once a day for four days by a panel of twenty-two evaluators using each of the cigarettes manufactured according to the embodiments and comparative example, based on a scale of 7 points.

Table 1 shows results of smoking sensory evaluation of the smoking articles manufactured according to Comparative Example 3 and Embodiments 2 to 5.

TABLE 1

| Classification | | | Satisfaction with taste | Satisfaction | |
|---|---|---|---|---|---|
| No. | Coating method | Sweetener materials | other than tobacco taste | with touch on lips | Off-taste |
| Comparative Example 3 | OP coating | Sucralose + citric acid | 3.1 | 3.5 | 4.1 |
| Embodiment 2 | Separate coating | | 3.7 | 4.4 | 3.5 |
| Embodiment 3 | | Salt + sodium saccharin + tomatine + citric acid | 5.2 | 5.0 | 3.3 |
| Embodiment 4 | | Sucralose + phenylacetic acid | 4.7 | 4.9 | 3.4 |
| Embodiment 5 | | Citric acid + salt | 4.9 | 4.9 | 3.6 |

As shown in Table 1, it can be seen that, in all of the sweetener-coated cigarettes according to Embodiments 2 to 5, satisfaction with taste and satisfaction with touch were higher and the off-taste was reduced as compared to the sweetener-coated cigarette according to Comparative Example 3.

Specifically, referring to the sensory characteristics of Comparative Example 3 and Embodiment 2 in which the same sweetener material formed of sucralose and citric acid was used, it can be seen that, rather than coating with a sweetener material in the OP coating process step, separately performing sweetener coating after performing OP coating using a coating solution based on water and ethanol is beneficial for all the sensory characteristics, and this is predicted to be due to the surface of the tipping paper being roughened or the sweetener material being removed in a particulate form due to some fine sweetener particles deposited due to the sweetener material not being sufficiently dissolved in the oil-based OP coating solution.

Meanwhile, it was found that there were significant differences in the sensory characteristics according to the composition of the sweetener material, even when the sweetener coating process was performed in the same manner. Specifically, referring to the sensory characteristics of Embodiments 2 to 5, it can be seen that the cigarettes according to Embodiments 3 to 5 had better sensory characteristics than the cigarette according to Embodiment 2, and particularly, the cigarette according to Embodiment 3 that was coated with the sweetener material formed of salt, sodium saccharin, tomatine, and citric acid was the most favorable in terms of the smoking sensory characteristics.

Those of ordinary skill in the art related to the present embodiments should understand that the present disclosure may be implemented in modified forms within the scope not departing from essential characteristics of the above description. Therefore, the methods disclosed herein should be considered as illustrative rather than limiting. The scope of the present disclosure is defined by the claims below rather than by the above description, and all differences within the scope equivalent to the claims should be interpreted as falling within the scope of the present disclosure.

What is claimed is:

1. A method of coating a tipping paper for a smoking article, the method comprising:

a design printing step of printing a design on at least a portion of the tipping paper;

an overprint (OP) coating step of coating a surface of the tipping paper with an OP coating solution; and a sweetener coating step of coating the surface of the tipping paper with a sweetener coating solution, wherein the sweetener coating step is performed as a separate process from the design printing step and the OP coating step, the sweetener coating solution consists of a sweetener composition and a mixed solvent of water and ethanol, and the sweetener composition consists of a first sweetener material which consists of one or more materials selected from a first group consisting of sodium glutamate, sodium chloride, sodium saccharin, xylitol, sucralose, tomatine, stevia, erythritol, and psicose; and a second sweetener material which consists of one or more materials selected from a second group consisting of citric acid, malic acid, lactic acid, and catechin; and optionally a third sweetener material which consists of one or more materials selected from a third group consisting of saccharin, menthol, eucalyptol, phenylacetic acid, and cinnamon oil.

2. The method of claim 1, wherein the sweetener coating step is performed after the design printing step and the OP coating step.

3. The method of claim 1, wherein a weight of the sweetener composition included in the sweetener coating solution is in a range of 3% to 40% of the total weight of the sweetener coating solution.

4. The method of claim 3, wherein the sweetener composition consists of: the first sweetener material and the second sweetener material.

5. The method of claim 3, wherein the sweetener composition consists of: the first sweetener material, the second sweetener material and the third sweetener material.

6. The method of claim 5, wherein a sum of weights of the first sweetener material and the third sweetener material included in the sweetener composition is in a range of 70% to 99% of the total weight of the sweetener composition, and a weight of the second sweetener material is in a range of 1% to 30% of the total weight of the sweetener composition.

7. The method of claim 4, wherein the first sweetener material includes a 1-1 sweetener material which is one or more selected from sodium glutamate and sodium chloride and a 1-2 sweetener material which is one or more selected from sodium saccharin, xylitol, sucralose, tomatine, stevia, erythritol, and psicose.

8. The method of claim 7, wherein a weight of the 1-1 sweetener material included in the sweetener composition is in a range of 1% to 30% of the total weight of the first sweetener material, and a weight of the 1-2 sweetener material is in a range of 70% to 99% of the total weight of the first sweetener material.

9. The method of claim 5, wherein a mixing ratio of the water to the ethanol included in the mixed solvent is in a range of 1:0.8 to 1:5.0.

10. The method of claim 9, wherein the mixing ratio of the water to the ethanol is dependent on composition of the sweetener composition.

11. The method of claim 10, wherein a weight ratio of the water with respect to the total weight of the mixed solvent is defined by Equation 1 below:

$$R_W = \frac{PW_1 + 0.85 \times PW_3}{PW_1 + 1.1 \times PW_2 + PW_3} \quad \text{[Equation 1]}$$

wherein, $R_W$ represents the weight ratio of the water with respect to the total weight of the mixed solvent, $PW_1$ represents parts by weight of the first sweetener material with respect to 1 part by weight of the sweetener composition, $PW_2$ represents parts by weight of the second sweetener material with respect to 1 part by weight of the sweetener composition, and $PW_3$ represents parts by weight of the third sweetener material with respect to 1 part by weight of the sweetener composition.

12. The method of claim 1, wherein the OP coating solution includes oil-based OP ink.

* * * * *